United States Patent
Hirakawa et al.

(10) Patent No.: US 6,959,404 B2
(45) Date of Patent: Oct. 25, 2005

(54) EXTENDED DYNAMIC RANGE WATCHDOG TIMER

(75) Inventors: Katsunobu Hirakawa, Ibaraki (JP); Weifeng Joe Zhou, Missouri City, TX (US); Jay B. Reimer, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 10/202,510

(22) Filed: Jul. 24, 2002

(65) Prior Publication Data

US 2003/0074594 A1 Apr. 17, 2003

Related U.S. Application Data

(60) Provisional application No. 60/314,482, filed on Aug. 23, 2001.

(51) Int. Cl.[7] ................................................. G06F 11/00
(52) U.S. Cl. ........................................................ 714/55
(58) Field of Search .............................. 714/55, 51, 10, 714/706

(56) References Cited

U.S. PATENT DOCUMENTS

| | | | | |
|---|---|---|---|---|
| 5,978,939 A | * | 11/1999 | Mizoguchi et al. | 714/55 |
| 6,023,776 A | * | 2/2000 | Ozaki | 714/55 |
| 6,173,339 B1 | * | 1/2001 | Yorimitsu | 710/5 |
| 6,260,162 B1 | * | 7/2001 | Typaldos et al. | 714/55 |
| 6,687,859 B2 | * | 2/2004 | Robsman et al. | 714/55 |
| 6,848,064 B2 | * | 1/2005 | Bolz | 714/47 |

\* cited by examiner

*Primary Examiner*—Robert Beausoliel
*Assistant Examiner*—Marc M Duncan
(74) *Attorney, Agent, or Firm*—Robert D. Marshall, Jr.; W. James Brady, III; Frederick J. Telecky, Jr.

(57) ABSTRACT

A data processor timer comprising a writeable control register, a look-up table and a loadable counter. The loadable counter operates in a first mode to load the count data field and operates in a second mode an entry from said look-up table specified by the count data field. The loadable counter generating a time out signal upon counting a number of clock pulses equal to said count. The writeable control register preferably includes a mode bit selecting the first or second modes. This invention is suitable for a pre-scalar counter as part of a data processor watchdog timer.

10 Claims, 4 Drawing Sheets

FIG. 3

EXTENDED DYNAMIC RANGE WATCHDOG TIMER

This application claims benefit to application No. 60/314,482, filed Aug. 23, 2001.

TECHNICAL FIELD OF THE INVENTION

The technical field of this invention is data processor peripherals and more particularly timers.

BACKGROUND OF THE INVENTION

Digital signal processors (DSP) designed for a range of applications and having a wide variety of architectures, commonly employ a number of peripheral device functions. FIG. 1 illustrates a conventional DSP architecture. In this example, DSP core 101 communicates with program/data memory 102 using M bus 100. M bus 100 is a complex bus that includes program read, data read and data write busses. Bus arbitration unit 106 receives signals from M bus 100 via lines 108, supplies signals 112 to program/data memory 102 and communications bi-directionally with DSP core 101 via control/acknowledge lines 107. A separate peripheral bus P bus 114 allows for data transfers among on-chip memory 102, multi-channel buffered serial ports 105 and host port interface (HPI) 115. Direct memory access (DMA) controller 113 manages these data transfers. Multi-channel buffered serial ports 105 also have a direct communication link with DSP core 101 and program/data memory 102. A configuration bus 103 provides DSP core 101 with access to configure peripherals such as DMA controller 113, multi-channel buffered serial ports 105, watchdog timer 109, general purpose timers 104 and general purpose I/O 110. Configuration bus 103 provides DSP core 101 with access to poll status information from all the on-chip peripherals. Configuration bus 103 allows DSP core 101 to input data to and output data from the peripherals such as multi-channel buffered serial ports 105 and general purpose I/O 110. RHEA bridge 111 allows DSP core 101 access to the configuration bus 103. The use of timer functions allows programmers to exercise control of system operation in a variety of critical circumstances.

FIG. 2 illustrates general purpose timer 110. General purpose timer 110 operates under the control of the 16-Bit timer control register (TCR) 235 described in. Table 1. Two fields of timer control register 235, timer divide down ratio (TDDR) 232 and pre-scalar count (PSC) 233, are the most pertinent for consideration here.

TABLE 1

| Bits | Description |
|---|---|
| 15–12 | Reserved |
| 11 | Soft: breakpoint related |
| 10 | Free: breakpoint related |
| 9–6 | PSC: Pre-Scalar Count |
| 5 | TRB: Timer Reload Control |
| 4 | TSS: Timer Stop Status |
| 3–0 | TDDR: Timer-Divide-Down Ratio |

The general purpose timer clock 222 is generated in buffered form from CPU clock 226. General purpose 110 timer consists of two major blocks. The first major block is main timer block 200, consisting of timer period register (PRD) 201, timer register/down counter (TIM) 203, state '0' decoder 204 and general purpose timer output block 205. The second major block is pre-scalar 210, consisting of timer control register (TCR) 235, 4-bit pre-scalar register/down counter 223, state '0' decoder 214 and pre-scalar clock output block 215. A 4-bit register (PSC) 233 holds bits 9-6 of timer control register (TCR) 235. The timer initialization causes register (PSC) 233 to be loaded with the contents of the timer divide down ratio (TDDR) bits 234 (bits 3-0) of the timer control register (TCR) 235. These four PSC bits 234 are loaded into the pre-scalar register/down counter (PSR/DC) 223 on detection of a '0' state in pre-scalar register/down counter 223 itself. The state '0' decoder 214 generates an active low clock gating signal for loading register 223 via OR gate 221.

Under normal operation, timer register/down counter 203 is loaded with the period value 209 of timer period register 201 on the same clock when timer register/down counter 203 decrements to '0'. The period value (PDR) 209 is also loaded into timer register/down counter 203 when the device is reset from reset input (SRESET) 218, or when the timer is individually reset from timer reset signal (TRB) 219. The main output of general purpose timer 104 is the timer interrupt (TINT) signal 230. This is sent to DSP core 101 via buffer 229 which forms timer output (TOUT) signal 228. The duration of a timer output signal 228 pulse is equal to the period of CPU clock 226.

Pre-scalar block 210 has two elements similar to time period register 201 and timer register/down counter 203. These are timer divide down ratio register (TDDR) 231 and pre-scalar register/down counter (PSR/DC) 223. Both timer divide down ratio register(TDDR) 231 and pre-scalar register/down counter (PSR/DC) 223 are fields in the timer control register 235. Under normal operation pre-scalar register (PSC) 233 is loaded with the value of the contents of timer divide down ratio register (TDDR) 231 when pre-scalar register/down counter (PSR/DC) 223 decrements to zero. This encoded timer divide down ratio value is also loaded into pre-scalar register/down counter (PSR/DC) 223 when the device is reset via reset signal (RESET) 218 or when the timer is individually reset via timer reset signal 219. Pre-scale register/down counter 223 is clocked by general purpose timer clock 222 derived from CPU clock 226 subject to the control of timer gating bit 227. Each CPU clock 226 decrements pre-scalar counter register 223 by one.

General purpose timer 104 can be stopped using timer gating bit 227 to turn off the clock input via AND gate 225. Stopping the operation of general purpose timer 104 allows the device to run in a low-power mode when the timer is not needed.

The rate of timer interrupt (TINT) signal 230 is equal to the frequency of CPU clock 226 divided by two independent factors:

$$TINT\ rate = \frac{1}{t_c(C)(u) \times (v)} = \frac{1}{t_c(C)(TDDR+1)(PRD+1)}$$

where: $t_c(c)$ is the period of CPU clock 226; u is the sum of the timer divide down ratio contents plus 1; and v is the sum of timer period register (PRD) 201 contents plus 1.

The current value in the timer can be read by reading timer register/down counter 203. Pre-scalar counter register 223 can be read by reading timer control register 235. Because it takes two instructions to read both registers, there may be a change between the two reads as the counter decrements. Therefore, when precise timing measurements are needed, it is more accurate to stop the timer before reading these two values. The timer can be stopped by setting timer gating bit 227 and re-started by clearing timer gating bit 227.

General purpose timer 104 can be used to generate a sample clock for peripheral circuits such as an analog interface. This can be accomplished by using timer output signal 228 to clock a device or by using timer interrupt (TOUT) signal 230 to periodically read a register.

General purpose timer 104 is initialized with the following steps:

1) Stop the timer by writing a '1' to timer gating bit 227 in timer control register (TCR) 235.
2) Load time period register 201.
3) Initialize the timer by reloading timer control register 235 to initialize timer divide down ratio. 231 Enable the timer by setting timer gating bit 227 to '0' and timer reset signal 219 to '1' to reload the timer period.

Optionally, assuming INTM='1', the timer interrupt may be enabled by:

1) Clearing any pending timer interrupts.
2) Enabling the timer interrupt.
3) Enabling interrupts globally, if necessary.

At reset, timer register/down counter 203 and timer period register 201 are set to a maximum value of hexadecimal 'FFFF'. A timer divide down ratio (TDDR) field of timer control register 235 is cleared to zero and the timer is started.

SUMMARY OF THE INVENTION

The purpose of a watchdog timer is to prevent system lock-up in case the software becomes trapped in loops with no controlled exit. The watchdog timer has a watchdog output X_WTOUT associated with it. The watchdog timer requires a special service sequence to be executed periodically. Without this periodic servicing, the watchdog timer counter reaches zero and times out. When the watchdog timer times out, an active low pulse will be asserted on the watchdog output pin X_WTOUT and an internal maskable interrupt will be triggered. The X_WTOUT pin is always driven. This X_WTOUT signal can be externally connected without additional logic to the local hardware reset or non-maskable interrupt of data processor.

The watchdog timer of this invention is a pre-scaled 16-bit counter that supports up to a 32-bit dynamic range. In the design of DSP core of the preferred embodiment, when a processor is coming out of reset, the watchdog timer is disabled in order to allow as much time as needed for code to be loaded to on-chip memory via a host port interface. Prior to being enabled, the watchdog timer counter will count down from its initial default value using the default pre-scalar value. When the counter reaches zero, a watchdog timeout event will occur in that a watchdog timer interrupt (WDTINT) request will be sent to DSP core 101 and a flag WDFLAG will be set.

With system clocks increasing in frequency, the period of a 16-bit timer with a 4-bit pre-scalar having a 20-bit dynamic range is decreasing. For example, with a CPU clock of 100 MHz corresponding to a 10 ns period, a 20-bit dynamic range timer times out after slightly more than 10 ms. In communications systems frame rates are of the order of 10 ms and the desired timeout rate for a watchdog timer is of the order of 1 sec. Therefore it is desired to have a watchdog timer with as much as a 32-bit dynamic range while retaining a 4-bit pre-scale period register.

BRIEF DESCRIPTION OF THE DRAWINGS

These and other aspects of this invention are illustrated in the drawings, in which:

FIG. 3 illustrates the block diagram of a 32-bit dynamic range watchdog timer function of this invention;

DETAILED DESCRIPTION OF PREFERRED EMBODIMENTS

Figure 1:
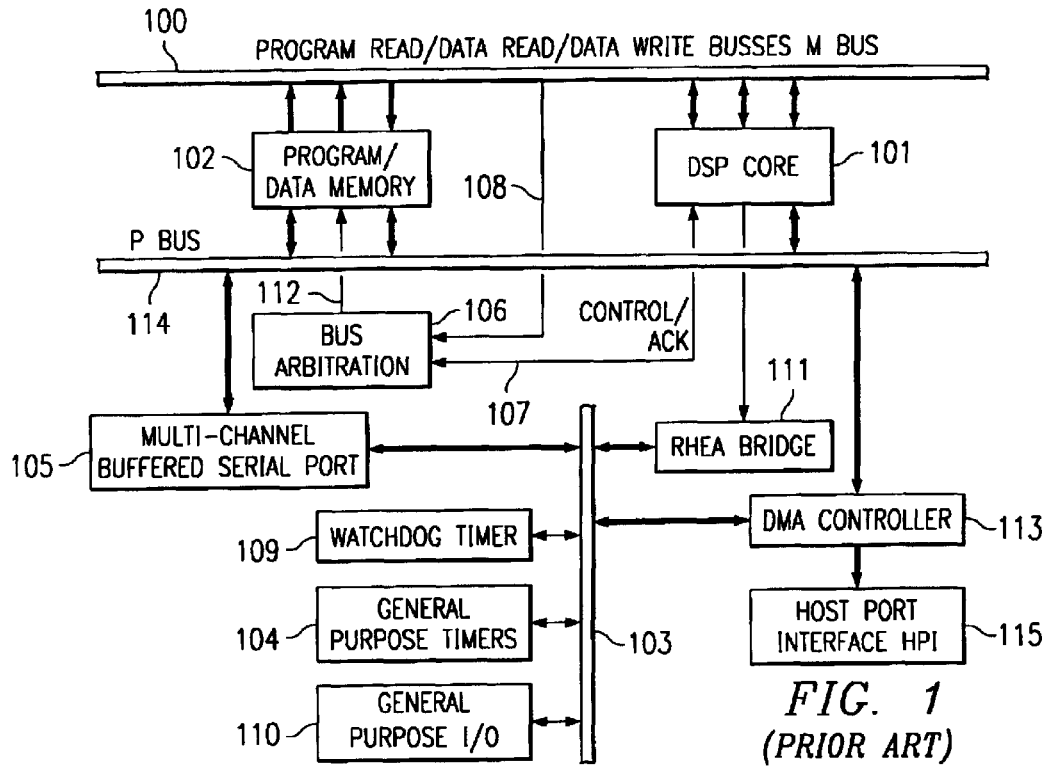
FIG. 1 illustrates the individual functional blocks of a conventional digital signal processor.

The watchdog timer of this invention is a pre-scaled 16-bit counter that supports up to a 32-bit dynamic range. In the design of DSP core of the preferred embodiment, when a processor is coming out of reset, the watchdog timer is disabled in order to allow as much time as needed for code to be loaded to on-chip memory via a host port interface. Prior to being enabled, the watchdog timer counter will count down from its initial default value using the default pre-scalar value. When the counter reaches zero, a watchdog timeout event will occur in that a watchdog timer interrupt (WDTINT) request will be sent to the DSP core and a flag (WDFLAG) will be set.

With system clocks increasing in frequency, the period of a 16-bit timer with a 4-bit pre-scalar total 20-bit dynamic range, is increasingly smaller. For example, with a CPU clock of 100 MHz corresponding to a 10 ns period, a 20-bit dynamic range timer times out after 10.48576 ms. In communications systems frames rates are of the order of 10 ms and the desired timeout rate for a watchdog timer is of the order of 1 sec. Therefore it is desired to have a watchdog timer with as much as a 32-bit dynamic range while retaining a 4-bit pre-scale period register. This invention provides a method by using the four-bit pre-scale period register to describe the number of lower order '1' bits in the pre-scale counter register/down counter. There are numerous other variations that could be used. For example, the four bits could be used as the 4 most significant bits of the 16-bit pre-scale counter. The invention is not limited to the initial embodiment, but is equally applicable to any embodiment in which an n-bit code is used to select an initial pre-scalar counter start value.

The purpose of a watchdog timer is to prevent system lock-up in case the software becomes trapped in loops with no controlled exit. The watchdog timer has a watchdog output X_WTOUT associated with it. The watchdog timer requires a special service sequence to be executed periodically. Without this periodic servicing, the watchdog timer counter reaches zero and times out. When the watchdog timer times out, an active low pulse will be asserted on the watchdog output X_WTOUT and an internal maskable interrupt will be triggered. The X_WTOUT pin is always driven. This X_WTOUT signal can be externally connected without additional logic to the local hardware reset or non-maskable interrupt of data processor.

However, since all maskable interrupts are disabled by default at reset, the watchdog output (WDTINT) 330 will not be serviced by the DSP core. Additionally, the watchdog output pin is disconnected from the watchdog time-out event, so no pulse will be generated on this pin. After this timeout, the counter and pre-scalar will be reloaded automatically and the watchdog will continue to count, timeout, reload, etc. After code download, the watchdog can be enabled to connect the X_WTOUT to the timeout event.

Once the watchdog is enabled, it cannot be disabled by software. It can be disabled only by watchdog time-out, software reset and hardware reset. A special key sequence is provided to prevent watchdog from being accidentally serviced while the software is trapped in a dead loop or in some other software failures.

Figure 3:
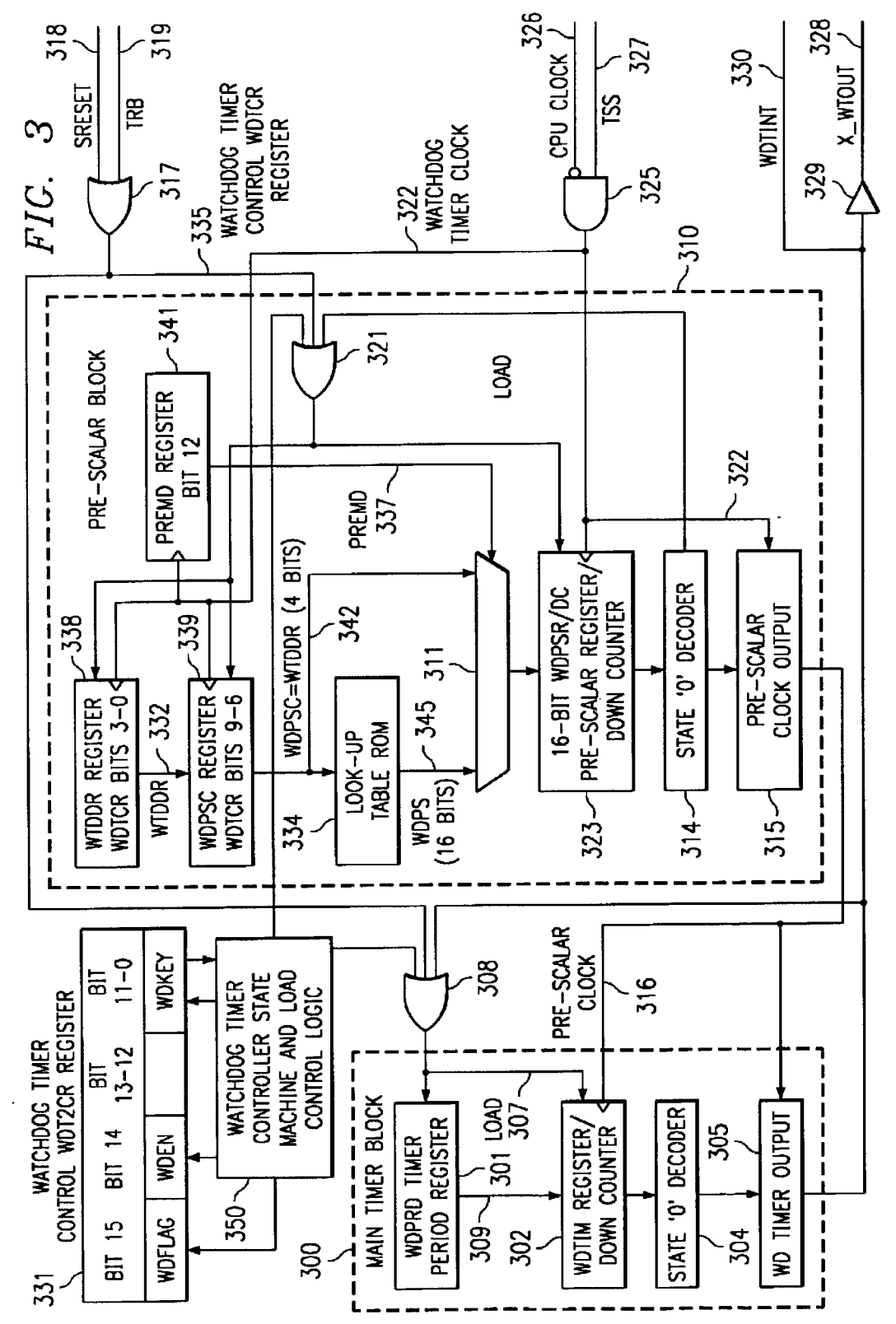

FIG. 3 illustrates the preferred embodiment of the watchdog timer 109 of this invention. The watchdog timer of this invention is a software-programmable timer that consists of four registers and can be used to periodically generate interrupts. The timer resolution is equal to the clock period of the processor core clock. The high dynamic range of the timer is achieved by using a 16-bit register/down counter (WDTIM) 302 in conjunction with a 4-bit watchdog pre-scalar register (WDPSC) 339 expanded effectively to 16 bits by the technique of this invention.

The preferred embodiment of this invention uses four memory-mapped watchdog timer registers. The description of these registers in the preferred embodiment are as follows.

Watchdog Timer Registers
1. Watchdog Timer Counter Register (WDTIM) 302 This register contains a 16-bit watchdog counter value. It is decremented once each watchdog clock cycle.
2. Watchdog Timer Period Register (WDPRD) 301 This register is used to reload the watchdog timer counter register (WDTIM) 302.
3. Watchdog Timer Control Register (WDTCR) 335 This register provides control and status information. Bit fields definitions for this register are shown below.
4. Watchdog Timer Second Control Register (WDT2SCR) 331 This 16-bit register contains the watchdog flag (WDFLAG) bit, watchdog enable (WDEN) bit, pre-scalar mode (PREMD) bit, and the 12-bit watchdog reset key (WDKEY) for watchdog service.

Watchdog timer 109 consists of two major blocks, the first of which is the main timer block 300, consisting of timer period register (WDPRD) 301, timer register/down counter (WDTIM) 302, state '0' decoder 304, and watchdog timer output block 305. The second major block is the pre-scalar block 310, consisting of first watchdog timer control register (WDTCR) 335 and pre-scalar mode bit (PREMD) 341, look-up table read only memory (ROM) 334, sixteen-bit watchdog pre-scalar register/down counter (WDPSR/DC) 323, '0' state decoder 314 and pre-scalar clock output block 315. Watchdog timer divide down ratio register (WTDDR) bits 332 are derived from watchdog timer control register (WDTCR) 338 bits 3-0. These bits are loaded into watchdog pre-scalar register (WDPSC) 339, which are bits 9-6 of watchdog timer control register (WDTCR) 335, and form the input WDPSC 342 to a look-up table ROM 334 which generates the sixteen watchdog pre-scalar bits (WDPS) 345. The output of look-up table ROM 334 is loaded into pre-scalar register/down-counter (WDPSR/DC) 323 if PREMD bit is 'high'. If the PREMD bit is 'low', multiplexer 311 routes the four bits 342 from watchdog timer divide down ratio register (WTDDR) 338 to the least significant bits of pre-scalar register/down-counter (WDPSR/DC) 323 and routes a '0' to the twelve most significant bits of pre-scalar register/down-counter (WDPSR/DC) 323. Watchdog timer (WDT) clock 322 is generated from CPU clock 326 as buffered by AND gate 325.

Watchdog timer 109 operates as an on-chip down counter that can be used to periodically generate interrupts. The watchdog timer register/down counter (WDTIM) 302 is clocked by a pre-scalar clock 316. Pre-scalar clock 316 has a frequency that is a fraction 1/(WTDDR+1) of the frequency of CPU clock 326. Watchdog timer register/down counter 302 decrements by one on every pre-scalar clock 326 cycle. Every time watchdog timer register/down counter (WDTIM) 302 decrements to zero, a watchdog timer interrupt (WDTINT) 330 is generated. Watchdog timer register/down counter (WDTIM) 302 is reloaded upon load signal 307 with the period value 309 stored in watchdog timer period register (WDPRD) 301.

Under normal operation, watchdog timer register/down counter (WDTIM) 302 is loaded with the contents of watchdog timer period register (WDPRD) 301 on the same clock when watchdog timer register/down counter (WDTIM) 302 decrements to zero. The contents 309 of watchdog timer period register (WDPRD) 301 are also loaded into watchdog timer register/down counter 304 when the data processor is reset via reset signal (RESET) 318 or when the timer is individually reset via watchdog timer reset signal (TRB) 319. The output of main timer block 300 is watchdog timer interrupt signal (WDTINT) 330 that is sent to DSP core 101. This signal is buffered in buffer 329 to form timer output signal (X_WDTOUT) 328. The duration of a timer output signal (X_WDTOUT) 328 pulse is equal to the period of watchdog timer clock 322.

Watchdog pre-scalar block 310 has two elements similar to watchdog timer register/down counter 303 and watchdog timer period register 301. These are watchdog pre-scalar register/down counter (WDPSR/DC) 323 and watchdog pre-scalar register (WDPSC) 339. The four bits of both watchdog timer pre-scalar counter (WDPSC) 339 and watchdog timer divide down ratio register (WTDDR) 338 are fields in the watchdog timer control register (WDTCR) 335. Under normal operation, watchdog pre-scalar counter (WDPSC) 339 is loaded with the contents of watchdog timer divide down ratio register (WDTDDR) 338 when watchdog pre-scalar register/down counter (WDPSR/DC) 323 decrements to state '0'. This watchdog timer divide down ratio (WDTDDR) 338 value is also loaded into watchdog pre-scalar counter (WDPSC) 339 when the device is reset responsive to reset signal 318 or when the timer is responsive to watchdog timer reset signal 319. Watchdog pre-scalar register/down counter (WDPSR/DC) 323 is clocked by CPU clock 322 subject to the control of gating signal 327 via gate 325. Each CPU clock 322 pulse decrements watchdog pre-scalar register/down counter (WDPSR/DC) 323 by one.

Watchdog timer 109 can be stopped by using watchdog clock gating signal 327 to turn off the clock input. Stopping the operation of watchdog timer 109 allows the device to run in a low-power mode when the timer is not needed.

The timer interrupt signal 330 rate is equal to the CPU clock signal 326 frequency divided by two independent factors:

$$\text{TINT rate} = \frac{1}{t_c(C)(u) \times (v)} = \frac{1}{t_c(C)(WDTDDR+1)(WDPRD+1)}$$

In the equation, $t_c(c)$ is the period of CPU clock, u is the sum of the watchdog timer divide down ratio (WDTDDR) contents plus 1, and v is the sum of the watchdog pre-scalar timer period register (WDPRD) 301 contents plus 1.

The current value in the timer can be read by reading watchdog timer register/down counter 303. Watchdog pre-scalar counter register 339 can be read by reading watchdog timer control register 335. Because it takes two instructions to read both registers, there may be a change between the two reads as the counter decrements. Therefore, when precise timing measurements are needed, it is more accurate to stop the timer before reading these two values. The timer can be stopped by setting watchdog timer gating bit 327 and re-started by clearing watchdog timer gating bit 327.

The bits of watchdog timer/control register 335 are preferably defined as shown below. These bits are divided into a watchdog timer first control register of 16 bits and a watchdog timer second control register of 16 bits. The watchdog timer first control register bits are defined as follows.

Bits 15 to 12 are reserved. These bits are undefined upon reset. These bits are read as 0. A write to these bits has no effect.

Bit 11 is the Soft bit. It is 0 upon reset. The Soft bit is used in conjunction with the Free bit to determine the state of the watchdog timer when a breakpoint is encountered in the high level language debugger. When the Soft bit is 0, the timer stops immediately. When the Soft bit is 1, the timer stops when the watchdog timer decrements to 0.

Bit 10 is the Free bit. It is 0 upon reset. The Free is used in conjunction with the Soft bit to determine the state of the watchdog timer when a breakpoint is encountered in the high level language debugger. When FREE is 0, the SOFT bit selects the timer mode as noted above. When FREE is 1, the watchdog timer runs free regardless of the Soft bit.

Bits 9 to 6 are the watchdog timer pre-scalar counter (WDPSC) 339 bits. These bits are undefined upon reset. These bits are only used when PREMD (in the watchdog timer second control register) is 0, placing pre-scalar counter 339 in direct mode.

Bits 5 and 4 are reserved. These bits are read as 0. A write to these bits has no effect.

Bits 3 to 0 are the reload bits for watchdog timer pre-scalar:

Case 1: When PREMD=0, watchdog timer divide down ratio register (WTDDR) 332 is a 4-bit reload pre-scalar. When watchdog pre-scalar register (WDPSC) 339 decrements to 0, watchdog pre-scalar register (WDPSC) 339 is loaded with the contents of watchdog timer divide down ratio register (WTDDR) 339.

Case 2: When PREMD=1, watchdog pre-scalar register (WDPSC) 339 is an indirect pre-scalar. Watchdog pre-scalar register (WDPSC) 339 is used to specify the timer pre-scalar.

TABLE 2

| Native Bits | Translated Bits |
| --- | --- |
| 0000 | 0000000000000001 |
| 0001 | 0000000000000011 |
| 0010 | 0000000000000111 |
| 0011 | 0000000000001111 |
| 0100 | 0000000000011111 |
| 0101 | 0000000000111111 |
| 0110 | 0000000001111111 |
| 0111 | 0000000011111111 |
| 1000 | 0000000111111111 |
| 1001 | 0000001111111111 |
| 1010 | 0000011111111111 |
| 1011 | 0000111111111111 |
| 1100 | 0001111111111111 |
| 1101 | 0011111111111111 |
| 1110 | 0111111111111111 |
| 1111 | 1111111111111111 |

The watchdog timer second control register (WDT2CR) 341 bits are defined as follows.

Bit 15 is the watchdog flag bit. This bit is undefined upon reset. The watchdog flag bit can be cleared by enabling the watchdog timer, by the data processor reset and by being written with '1'. The watchdog flag bit is set by a watchdog time-out. A state of 0 indicates no watchdog timeout has occurred. A state of 1 indicates that a watchdog timeout has occurred.

Bit 14 is the watchdog timer enable bit. This bit is 0 upon reset. If the watchdog timer enable bit is 0, then the watchdog timer is disabled. The watchdog output pin X_WTOUT is disconnected from the watchdog time-out event. If the watchdog timer enable bit is 1, then the watchdog timer is enabled. Once enabled, the watchdog output pin X_WTOUT is connected to the watchdog time out event. The watchdog timer can be disabled by watchdog time out or reset.

Bit 13 is reserved. This bit is read as 0. A write to this bit has no effect.

Bit 12 is the pre-scalar mode select (PREMD) bit. If PREMD is 0, then the watchdog timer operates in a direct mode. The contents of watchdog timer divide down ratio register (WDTDDR) 338 is used as 4-bit reload source watchdog for pre-scalar register/down counter (WDPSR/DC) 323. If PREMD is 1, then the watchdog timer operates in an indirect mode. The contents of watchdog timer divide down ratio register (WDTDDR) 338 is used to select individual pre-scalar value from look-up table ROM 334. The contents of look-up table ROM 334 are shown in Table 2.

Bits 11 to 0 form a 12-bit watchdog reset key. The watchdog time may only be serviced with software employing this key. In the preferred embodiment, only the sequence of a hexadecimal 5C6 followed by hexadecimal A7E services the watchdog.

Figure 4:
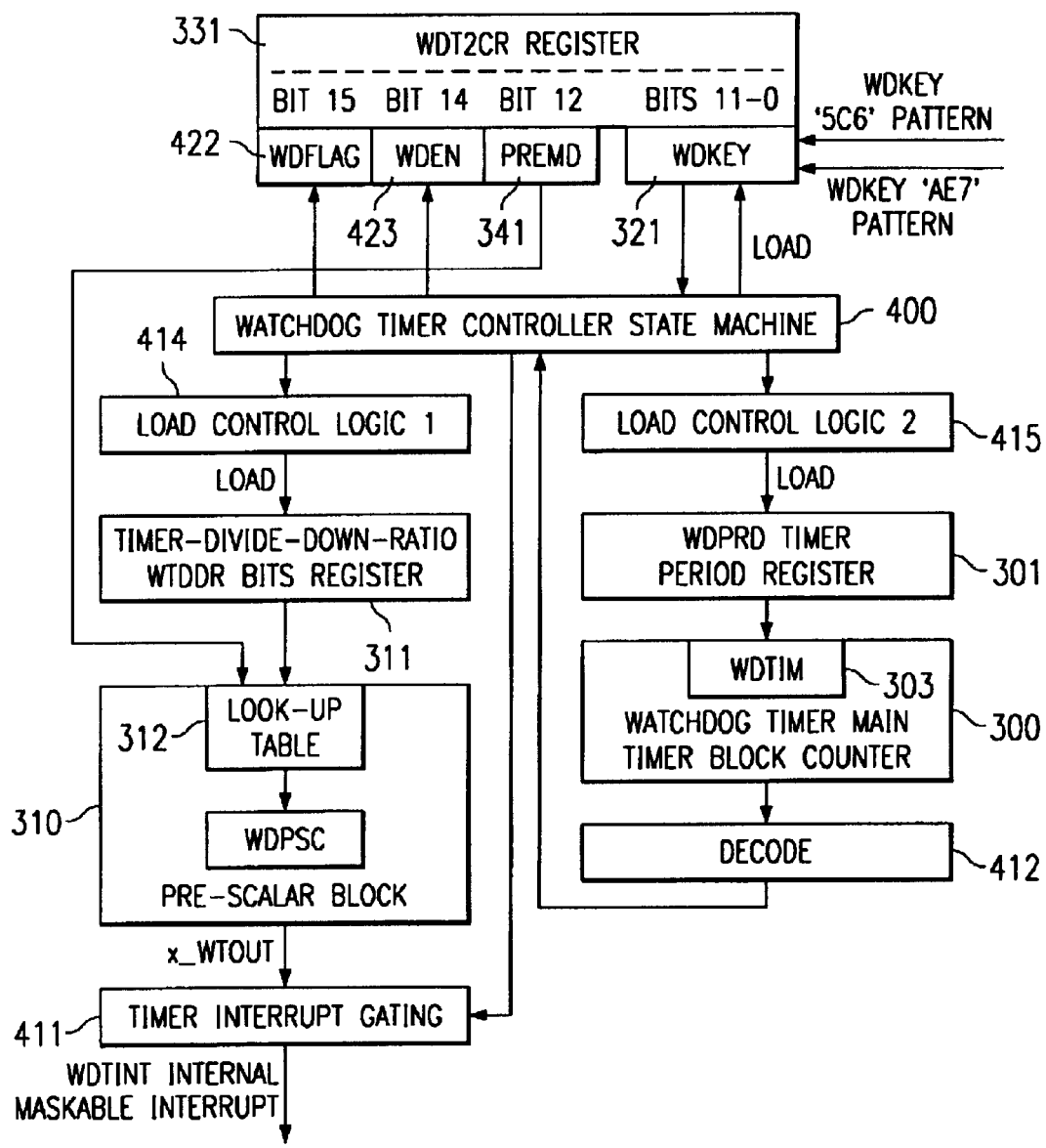
FIG. 4 illustrates the block diagram of the watchdog timer controller/state machine illustrated in FIG. 3 and associated functions.

FIG. 4 illustrates a block diagram of the watchdog timer controller/state machine and associated functions. The watchdog timer second control register (WDT2CR) 331 holds watchdog reset key (WDKEY) bits 321, watchdog flag bit (WDFLAG) 422, watchdog timer enable bit (WDEN) 423 and watchdog pre-scalar mode select (PREMD) bit 341. Watchdog timer controller/state machine 400 loads watchdog key reset bits 321 as programmed and controls loading of watchdog timer divide down ratio register (WDTDDR) 338 and watchdog timer period register (WDPRD) 301.

Figure 5:
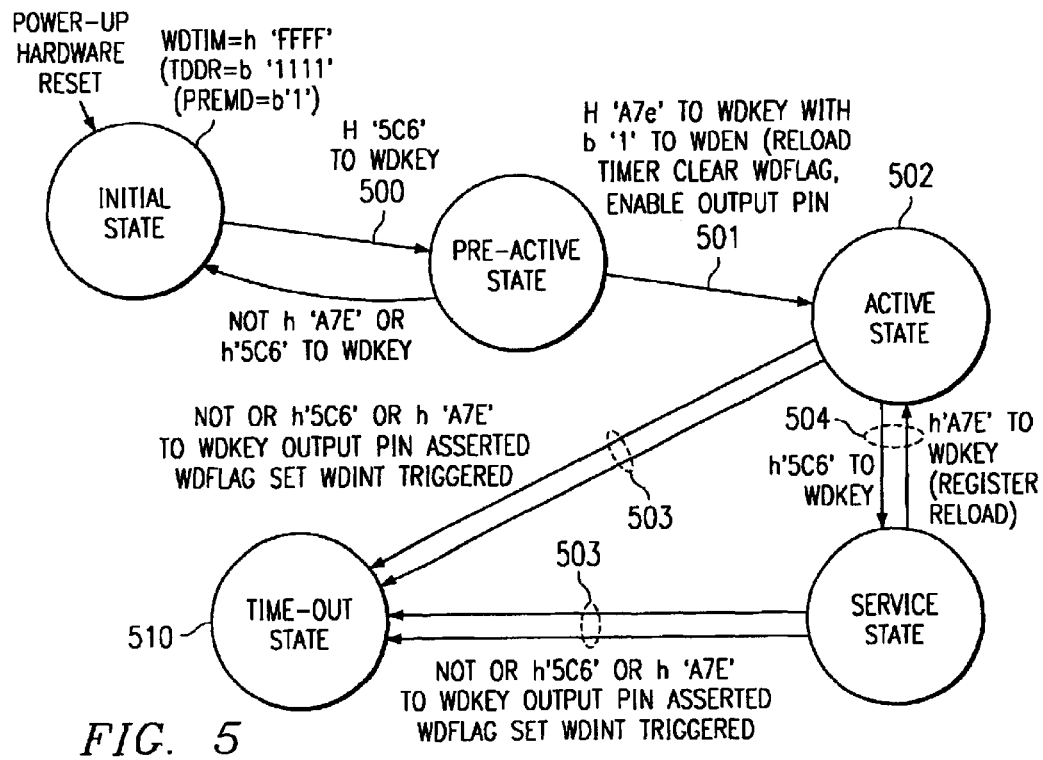
FIG. 5 illustrates the state diagram of a 32-bit dynamic range watchdog timer function of this invention.
Figure 2:
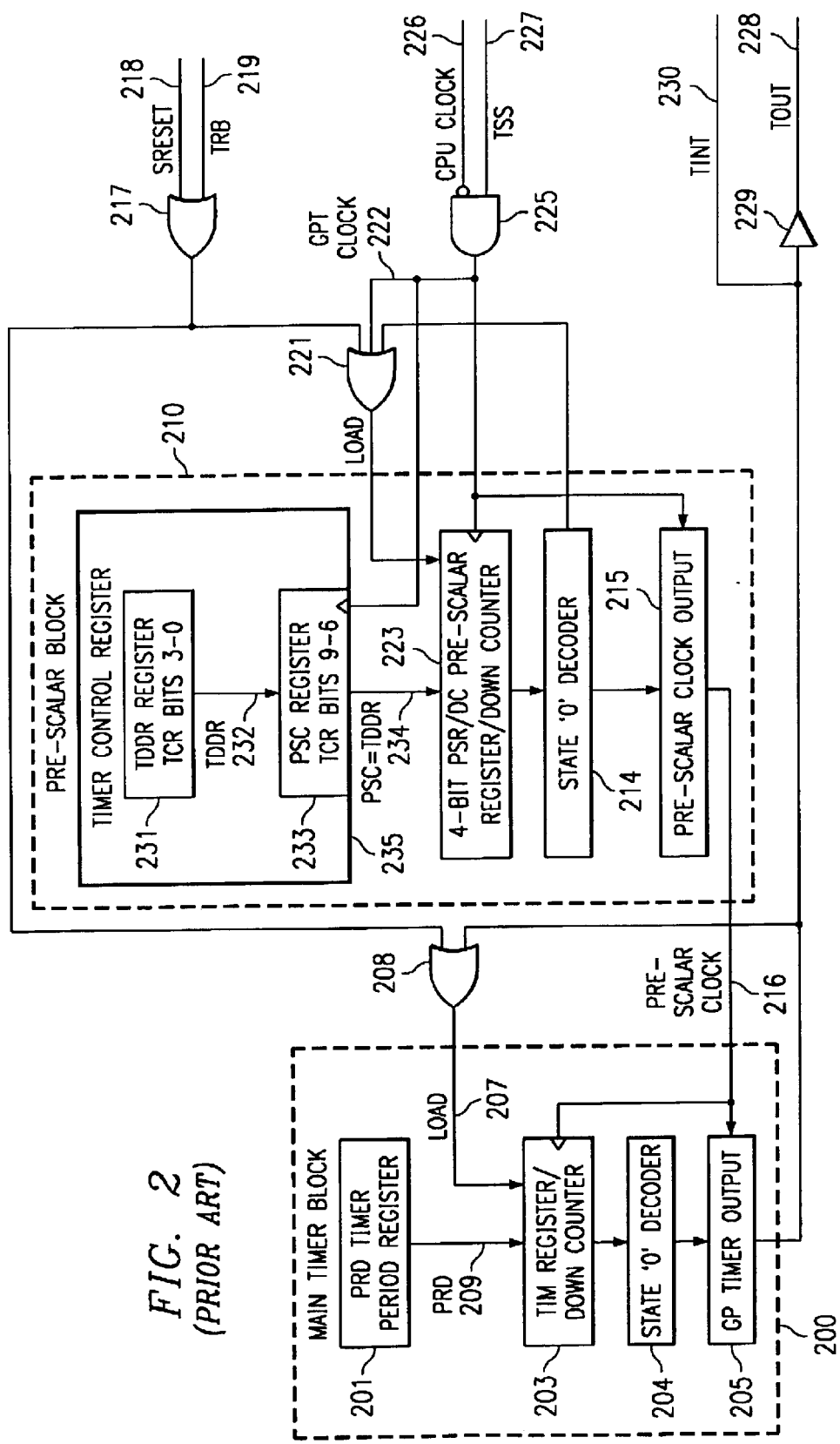
FIG. 2 illustrates the block diagram of a prior art general purpose timer.

FIG. 5 illustrates the state diagram of the overall watchdog timer function. The watchdog timer must be serviced periodically with the sequence of a hexadecimal 5C6 written to watchdog timer reset key bits 321 (state transition 500) followed by a hexadecimal A7E written to watchdog timer reset key bits 321 (state transition 501) before the watchdog timer times out. Both hexadecimal 5C6 and hexadecimal A7E may be written to watchdog timer reset key bits 321. Only the sequence of hexadecimal 5C6 followed by hexadecimal A7E to watchdog timer reset key bits 321 services the watchdog timer. Any other writes to watchdog timer reset key bits 321 will trigger the watchdog time-out immediately. Upon watchdog time out:

1. Watchdog output (X_WTOUT) 328 generates an active low pulse.
2. Watchdog flag bit 422 in watchdog timer second control register (WDT2CR) 331 will be set to 1.
3. The internal maskable watchdog timer interrupt (WDTINT) 330 will be triggered.
4. A read from watchdog timer control register (WDTCR) 335 will not cause time-out.

When the watchdog timer is in the time-out state 510, the watchdog timer is disabled and watch timer enable bit (WDEN) 423 is cleared. Watchdog output pin (X_WTOUT) 330 is disconnected from the watchdog time-out event. Finally, the watchdog timer is reloaded and continues to run.

FIG. 5 illustrates the sequence that must be followed to enable the watchdog timer. Upon reset, the watchdog timer is disabled (Initial State). Reads and writes of the watchdog timer registers are allowed. Writing hexadecimal 5C6 to watchdog reset key bits (WDKEY) 321 (state transition 500) causes the watchdog timer to enter the pre-active state.

The watchdog timer moves from the pre-active state to the active state (state transition 501) upon to a write to watchdog timer second control register (WDT2CR) 331 with a '1' written to watchdog timer enable bit (WDEN) 423 and hexadecimal A7E written to watchdog reset key bits (WDKEY) 321. Once the watchdog timer is enabled, it cannot be disabled by software. Any writes to watchdog timer second control register (WDT2CR) 331 from the active or service states that do not write hexadecimal 5C6 or A7E to watchdog reset key bits (WDKEY) 321, will result in an immediate watchdog timeout (state transitions 503). Writing the sequence of hexadecimal 5C6 and hexadecimal A7E to watchdog reset key bits (WDEN) 321 causes the watchdog timer to transition between the active and service states (state transitions 504). The transition from the service state to the active state results in the timer register reload that is necessary to keep the watchdog timer from timing out. Each time the watchdog is serviced by this sequence, the watchdog timer register/down counter ((WDTIM) 302 and watchdog pre-scalar register/down counter (WDPSR/DC) 323 will automatically be reloaded.

The registers watchdog register/down counter (WDTIM) 302, watchdog period register (WDPRD) 301, watchdog timer control register (WDTCR) 335 and pre-scalar mode bit (PREMD) 341 in watchdog timer second control register (WDT2CR) 331 must be configured before the watchdog enters the active state. By default, WDTIM=hexadecimal FFFF, WDPRD=hexadecimal FFFF, PREMD=1, TDDR= binary 1111.

Writing a '1' to watchdog enable bit (WDEN) 423 and configuring pre-scalar mode bit (PREMD) 341 must be done at the same time as writing hexadecimal A7E to watchdog reset key bits (WDKEY) 321 to cause the watchdog to transition from the pre-active state to the active state 502.

The watchdog timer is disabled before it enters the active state 503. Even though disabled, the watchdog interrupt (WDINT) 330 may be triggered periodically although the watchdog output (X_WTOUT) 328 will not be asserted. This interrupt may be utilized to indicate that watchdog is not in active state and allow the watchdog timer to act as a general purpose time counting if the watchdog functionality is not needed.

Once the watchdog timer is enabled, writes to registers watchdog register/down counter (WDTIM) 303, watchdog period register (WDPRD) 301 and watchdog timer first control register (WDTCR) 320 will have no effect. Writes to the watchdog flag bit (WDFLAG) 422, watchdog enable bit (WDEN) 423 and pre-scalar mode bit (PREMD) 341 in watchdog timer second control register (WD2CR) 320 will have no effect. However, writing an incorrect key not hexadecimal 5C6 or A7E to watchdog reset key bits (WDKEY) 321 will result in an immediate timeout.

This description has included loadable down counters such as register/down counter (WDTIM) 302 and pre-scalar register/down counter (WDPSR/DC) 323 and corresponding state '0' decoders 304 and 314. Those skilled in the art would recognize that up counting until a count value equals the preloaded value is an equally suitable manner to embody this invention.

This invention permits greater range of times in the watchdog time without requiring much additional hardware. Through the use of look-up table ROM 334 the four prior pre-scalar bits are expanded into 16 bits. Thus no additional bits within the control register are required. This invention is advantageous even if the control register included 12 otherwise unused bits to be devoted to the expanded pre-scalar count. This invention saves the extra bother to specify and load the extra 12 bits into the control register. This invention does not permit all possible 16 bit pre-scalar counts. However, the range of counts is great enough to be useful.

What is claimed is:

1. A data processor timer comprising:
    a writeable control register including a count data field having of N bits;
    a look-up table having an input of N bits connected to said count data field of said writeable control register and $2^N$ data entries, each data entry having M bits where M is greater than N, each N bit input specifying one said $2^N$ entries for output; and
    a loadable counter storing a count, receiving and counting clock pulses, said loadable counter operable in a first mode to load as said count said count data field and operable in a second mode to load said count an entry from said look-up table specified by said count data field, said loadable counter generating a time out signal upon counting a number of clock pulses equal to said count.

2. The data processor timer of claim 1, wherein:
    said loadable counter includes a multiplexer having a first input connected to said count data field of said control register, a second input connected to an output of said look-up table and an output, said output equal to said first input in said first mode and equal to said second input in said second mode.

3. The data processor timer of claim 2, wherein:
    said writeable control register includes a mode bit having a first state in said first mode and a second state in said second mode; and
    said multiplexer further includes a control input connected to said mode bit of said writeable control register, said control input controlling selection of said first input or said second input.

4. The data processor timer of claim 1, wherein:
    each entry of said look-up table includes $2^N$ bits, each entry of said look-up table having a number of right most "1's" equal to one more than a number represented by said count data field.

5. The data processing timer of claim 4, wherein:
    said count data field of said writeable control register consists of 4 bits;
    said look-up table consists of 16 entries of 16 bits each and follows

| Count Data Field | Look-up Table Entry |
|---|---|
| 0000 | 0000000000000001 |
| 0001 | 0000000000000011 |
| 0010 | 0000000000000111 |
| 0011 | 0000000000001111 |
| 0100 | 0000000000011111 |
| 0101 | 0000000000111111 |
| 0110 | 0000000001111111 |
| 0111 | 0000000011111111 |
| 1000 | 0000000111111111 |
| 1001 | 0000001111111111 |
| 1010 | 0000011111111111 |
| 1011 | 0000111111111111 |
| 1100 | 0001111111111111 |
| 1101 | 0011111111111111 |
| 1111 | 1111111111111111 |

6. A data processor watchdog timer comprising:
    a writeable control register including a pre-scalar count data field having of N bits;

a look-up table having an input of N bits connected to said pre-scalar count data field of said writeable control register and $2^N$ data entries, each data entry having M bits where M is greater than N, each N bit input specifying one said $2^N$ entries for output; and a first loadable counter storing a first count, receiving and counting clock pulses, said loadable counter operable in a first mode to load as said first count said pre-scalar count data field and operable in a second mode to load as said first count an entry from said look-up table specified by said pre-scalar count data field, said loadable counter generating a pre-scalar count signal upon counting a number of clock pulses equal to said count;

a time period register storing a second count;

a second loadable counter storing a second count, receiving and counting pre-scalar count signals from said first loadable counter, said second loadable counter operable to load as said second count said second stored in said time period register, said second loadable counter generating an interrupt to said data processor upon counting a number of pre-scalar count signals equal to said second count.

7. The data processor watchdog timer of claim 6, wherein:

said first loadable counter includes a multiplexer having a first input connected to said pre-scalar count data field of said control register, a second input connected to an output of said look-up table and an output, said output equal to said first input in said first mode and equal to said second input in said second mode.

8. The data processor watchdog timer of claim 7, wherein:

said writeable control register includes a mode bit having a first state in said first mode and a second state in said second mode; and said multiplexer further includes a control input connected to said mode bit of said writeable control register, said control input controlling selection of said first input or said second input.

9. The data processor watchdog timer of claim 6, wherein:

each entry of said look-up table includes $2^N$ bits, each entry of said look-up table having a number of right most "1's" equal to one more than a number represented by said count data field.

10. The data processing watchdog timer of claim 9, wherein:

said pre-scalar count data field of said writeable control register consists of 4 bits;

said look-up table consists of 16 entries of 16 bits each and follows

| Count Data Field | Look-up Table Entry |
|---|---|
| 0000 | 0000000000000001 |
| 0001 | 0000000000000011 |
| 0010 | 0000000000000111 |
| 0011 | 0000000000001111 |
| 0100 | 0000000000011111 |
| 0101 | 0000000000111111 |
| 0110 | 0000000001111111 |
| 0111 | 0000000011111111 |
| 1000 | 0000000111111111 |
| 1001 | 0000001111111111 |
| 1010 | 0000011111111111 |
| 1011 | 0000111111111111 |
| 1100 | 0001111111111111 |
| 1101 | 0011111111111111 |
| 1110 | 0111111111111111 |
| 1111 | 1111111111111111. |

* * * * *